US011287639B2

(12) United States Patent
Jones

(10) Patent No.: US 11,287,639 B2
(45) Date of Patent: Mar. 29, 2022

(54) REMOVABLY ATTACHABLE EYEPIECE SHIELD

(71) Applicant: Alpine Innovations LLC, Lehi, UT (US)

(72) Inventor: Darren Jones, American Fork, UT (US)

(73) Assignee: Alpine Innovations LLC, Lehi, UT (US)

( * ) Notice: Subject to any disclaimer, the term of this patent is extended or adjusted under 35 U.S.C. 154(b) by 327 days.

(21) Appl. No.: 16/307,928

(22) PCT Filed: Jun. 6, 2017

(86) PCT No.: PCT/US2017/036230
§ 371 (c)(1),
(2) Date: Dec. 6, 2018

(87) PCT Pub. No.: WO2017/214206
PCT Pub. Date: Dec. 14, 2017

(65) Prior Publication Data

US 2019/0265458 A1 Aug. 29, 2019

Related U.S. Application Data

(60) Provisional application No. 62/347,003, filed on Jun. 7, 2016.

(51) Int. Cl.
*G02B 23/16* (2006.01)
*G02B 23/18* (2006.01)
*F41G 1/38* (2006.01)

(52) U.S. Cl.
CPC ............ *G02B 23/16* (2013.01); *G02B 23/18* (2013.01); *F41G 1/38* (2013.01)

(58) Field of Classification Search
CPC ...... G02B 23/16; G02B 23/18; G02B 23/165; F41G 1/38

(Continued)

(56) References Cited

U.S. PATENT DOCUMENTS 1,808,642 A 6/1931 Duffy
2,271,380 A * 1/1942 Strang .................... G02B 23/16 359/600

(Continued)

FOREIGN PATENT DOCUMENTS

GB 376495 A 7/1932

OTHER PUBLICATIONS

Amazon https://www.amazon.com/Slicker-Bino-Bandit-Improves-Binoculars/dp/B08X9YS4H1 Slicker Bino Bandit (Year: 2017).*

(Continued)

*Primary Examiner* — George G. King
(74) *Attorney, Agent, or Firm* — Thorpe North & Western, LLP; David W. Osborne

(57) ABSTRACT

An eyepiece shield (10, 10*b*) for a sporting optic (14, 14*b*), such as binoculars or a spotting scope, comprises an irregular frusto-conical shell (22, 22*b*) with a narrower end circumscribing at least one eyepiece hole (26), and a wider end circumscribing an oblong eye opening (30, 30*b*). The eye opening is non-parallel with the eyepiece hole, and has a concave profile with respect to at least one viewing axis (34) between the holes. The shell comprises a flexible and resilient, laminate material with different inner and outer layers sandwiching an intermediate foam layer. In addition, the shield comprises a fastener (114) with first and second fastener portions (118, 120) carried on opposite sides of the shell at the eye opening to closed the shield with the opposite (Continued)

sides of the eye opening folded in towards one another, and the fastener is fastened with the first and second fastener portions joined together.

7 Claims, 14 Drawing Sheets

(58) Field of Classification Search
USPC ........................................ 359/600, 609, 612
See application file for complete search history.

(56) References Cited

U.S. PATENT DOCUMENTS 2,316,164 A * 4/1943 Hoffeditz ............... G02B 23/18 359/409
3,738,238 A * 6/1973 Hager .................. G03B 11/046 396/373
4,971,429 A * 11/1990 Ishido .................... G02B 23/18 359/409
5,431,970 A 7/1995 Broun
7,104,658 B2 9/2006 Fischbach
9,772,497 B1 * 9/2017 Hewlett ................. G02B 7/008
2005/0174647 A1 8/2005 Fischbach
2009/0046369 A1 2/2009 Aikawa
2009/0147366 A1 6/2009 Fan
2010/0172026 A1 7/2010 Steiner et al.
2011/0292506 A1 12/2011 Ramboyong
2013/0250423 A1 * 9/2013 Trantham ............... G02B 27/04 359/601
2016/0147077 A1 * 5/2016 Woolpert ............... G02B 30/36 359/477

OTHER PUBLICATIONS

Youtube—BinoSlicker Bandit from Alpine Innovations, https://www.youtube.com/watch?v=hu2lelvtMls (Year: 2016).*

Alpine Products webpage, http://www.alpineproducts.com/c-103-Slicker.aspx (Year: 2016).*

International Search Report dated Nov. 8, 2017, in International Application No. PCT/US2017/036230, filed Jun. 6, 2017; 4 pages.

* cited by examiner 118
54
30
78
46
66
10
110
62
42
22
26
18
50
50
18
26
34
14

REMOVABLY ATTACHABLE EYEPIECE SHIELD

PRIORITY DATA

This application claims the benefit of U.S. Provisional Patent Application Ser. No. 62/347,003, filed Jun. 7, 2016, which is incorporated herein by reference.

BACKGROUND

Sporting optics, such as binoculars or spotting scopes, are often used during sporting activities, such as hunting. The sporting optic has one or two eyepieces through which the user looks. Such eyepieces are typically circular or cylindrical, and a gap can be formed between the eyepiece and the user's face and/or eye(s). Such a gap can result in light interference on a lens in the eyepiece, obscuring visibility through the sporting optic. In addition, such a gap can permit debris, such as dirt or lint, to enter into the eyepiece, obscuring visibility through the sporting optic.

SUMMARY

An eyepiece shield for a sporting optic, such as binoculars, a rifle scope, or a spotting scope, blocks ambient light and weather, and reduces eye strain and improves visual acuity. The eyepiece shield comprises an irregular frustoconical shell. The shell has a narrower end circumscribing at least one eyepiece hole to receive an eyepiece of the sporting optic. The shell also has a wider end circumscribing an oblong eye opening for receiving a user's eye. The eye opening is non-parallel with the eyepiece hole, and has a concave profile with respect to at least one viewing axis between the holes.

In one aspect, the shell can comprise a flexible and resilient, and/or an elastic, material. In addition, the shell can comprise a laminate with different inner and outer layers sandwiching an intermediate foam layer. Thus, for example, the inner layer can be plush and the outer layer can be moisture resistant.

In another aspect, the eyepiece shield is configured for a sporting optic with dual eyepieces, such as binoculars. Thus, the shell has a narrower end circumscribing a pair of eyepiece holes to receive the dual eyepieces, respectively, of the sporting optic. In another aspect, the eyepiece shield is configured for a sporting optic with a single eyepiece, such as a spotting scope. Thus, the shell has a narrower end circumscribing a single eyepiece hole to receive the single eyepiece of the sporting optic.

In another aspect, the shield comprises a fastener with first and second fastener portions carried on opposite sides of the shell at the eye opening, respectively. The shell has at least two configurations, including: 1) an open configuration, and 2) a closed configuration. In the open configuration, the eye opening is open and the fastener is unfastened with the first and second fastener portions separated. In the closed configuration, the opposite sides of the eye opening are folded in towards one another, and the fastener is fastened with the first and second fastener portions joined together.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
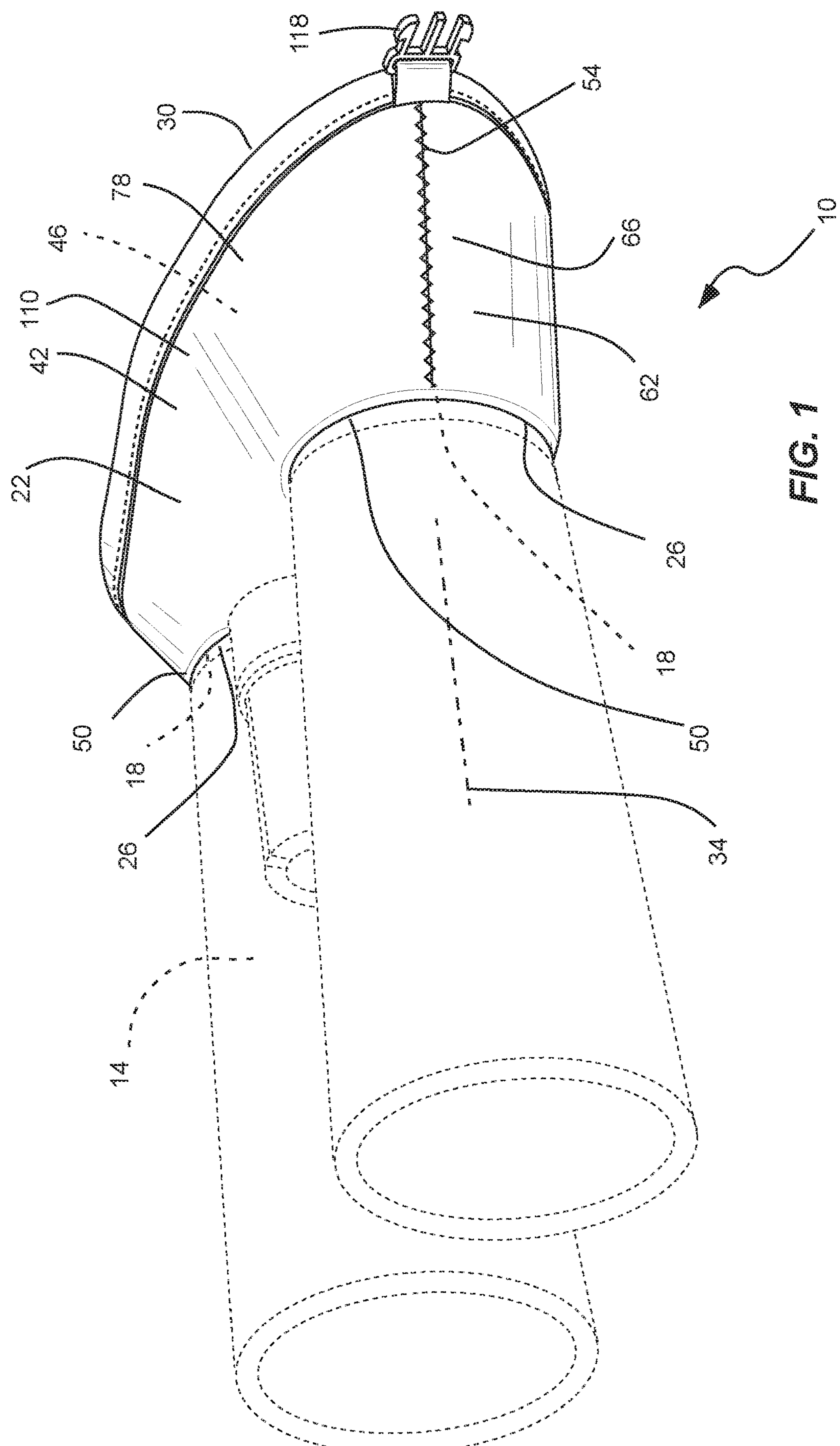
FIG. 1 is a front perspective view of an eyepiece shield in accordance with an embodiment of the invention, shown coupled to a sporting optic, namely binoculars by way of example, and shown in an open and/or use configuration.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a particle" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The term "sporting optic" is used herein to refer to optics that provide magnification of distal or far-field objects, thus enlarging the object to view or bringing the object into closer view, or clarification of the object, or even different visualization of objects, including by way of example, a binocular, a field-glass, a monocular, a telescope, a spotting scope, a scope, a rifle scope, a night vision optic, a range finder, a thermal viewer, a sight, a camera, etc. Such optics are typically utilized outdoors and for various activities, such as hunting, shooting, target shooting, archery, bird or nature watching, etc. In addition, such optics can be typically suspended or hung around a user's neck.

The terms "interference fit" and "friction fit" are terms of art used interchangeably herein to refer to deliberately causing, increasing and/or using friction to deliberately resist movement. An interference fit or friction fit is different than and greater than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another.

Removably Attachable Eyepiece Shield

An initial overview of technology embodiments is provided below and specific technology embodiments are then described in further detail. This initial summary is intended to aid readers in understanding the technology more quickly, but is not intended to identify key or essential features of the technology, nor is it intended to limit the scope of the claimed subject matter.

An eyepiece shield for a sporting optic, such as binoculars or a spotting scope, blocks ambient light or glare, and weather, such as wind, rain and dust, and thus can reduce eye strain and can improve visual acuity. The eyepiece shield comprises an irregular frusto-conical shell. The shell has a narrower end circumscribing at least one eyepiece hole to receive an eyepiece of the sporting optic. In one aspect, the shield and the shell can have a single eyepiece hole to receive the single eyepiece of a sporting optic, such as a spotting scope. In another aspect, the shield and the shell can have a pair of eyepiece holes to receive the pair of eyepieces, or dual eyepieces, of a sporting optic such as binoculars. The shell also has a wider end circumscribing an oblong eye opening for receiving a user's eye(s). The eye opening is non-parallel with the eyepiece hole, and has a concave profile with respect to at least one viewing axis between the holes. Thus, the eye opening can substantially match the contours of the user's face. In one aspect, the eye opening can be smaller and sized to fit a single eye of the user, such as when used with a sporting optic with a single eyepiece, such as a spotting scope. In another aspect, the eye opening can be larger and sized to fit both eyes of the user, such as when used with a sporting optic with dual eyepieces, such as binoculars.

In one aspect, the shell comprises a flexible and resilient, and/or an elastic, material, such as neoprene. The flexible and resilient (or elastic) material can allow the eyepiece hole to be easily stretched over an eyepiece of the sporting optic for installation, and held in place by a friction fit. In addition, the flexible and resilient (or elastic) material can allow the shell and/or the eye opening to conform to the contours of the user's face to resist gaps. Furthermore, the flexible and resilient (or elastic) material can allow the shell to provide a cushioned or softer fit when abutting the user's face to reduce fatigue. In addition, the shell can comprise a laminate, such as laminated or layered neoprene, with different inner and outer layers sandwiching an intermediate foam layer. For example, the inner layer can be plush and the outer layer can be moisture resistant. Thus, the plush inner layer can protect the exposes lens of the eyepiece, while the moisture resistant outer layer can resist moisture from absorbing into the intermediate or inner layers. The moisture resistant outer layer can also resist moisture from entering into the shell to reduce fogging of the lenses of the eyepiece (s). The inner and outer layers can be fabric. The intermediate foam layer can be compressible, and can have a cellular structure, such as neoprene. Thus, the intermediate layer can provide a comfortable, cushioned feel against the user's face to reduce fatigue.

In one aspect, the eyepiece shield is configured for a sporting optic with a single eyepiece, such as a spotting scope or rifle scope. Thus, the shell can have a single eyepiece hole to receive the single eyepiece of the sporting optic, and a single eye hole. In another aspect, the eyepiece shield is configured for a sporting optic with dual eyepieces, such as binoculars or field glasses. Thus, the shell can have a pair of eyepiece holes to receive the dual eyepieces, respectively, of the sporting optic, and a single eye hole.

In another aspect, the shield comprises a fastener with first and second fastener portions carried on opposite sides of the shell at the eye opening, respectively. The shell has at least two configurations, including: 1) an open configuration, and 2) a closed configuration. In the open configuration, the eye opening is open and the fastener is unfastened with the first and second fastener portions separated. In the closed configuration, the opposite sides of the eye opening are folded in towards one another, and the fastener is fastened with the first and second fastener portions joined together. Thus, the shell can be closed over the eyepiece(s) of the sporting optic to protect the lens(es) thereof when not in use.

Figure 2:
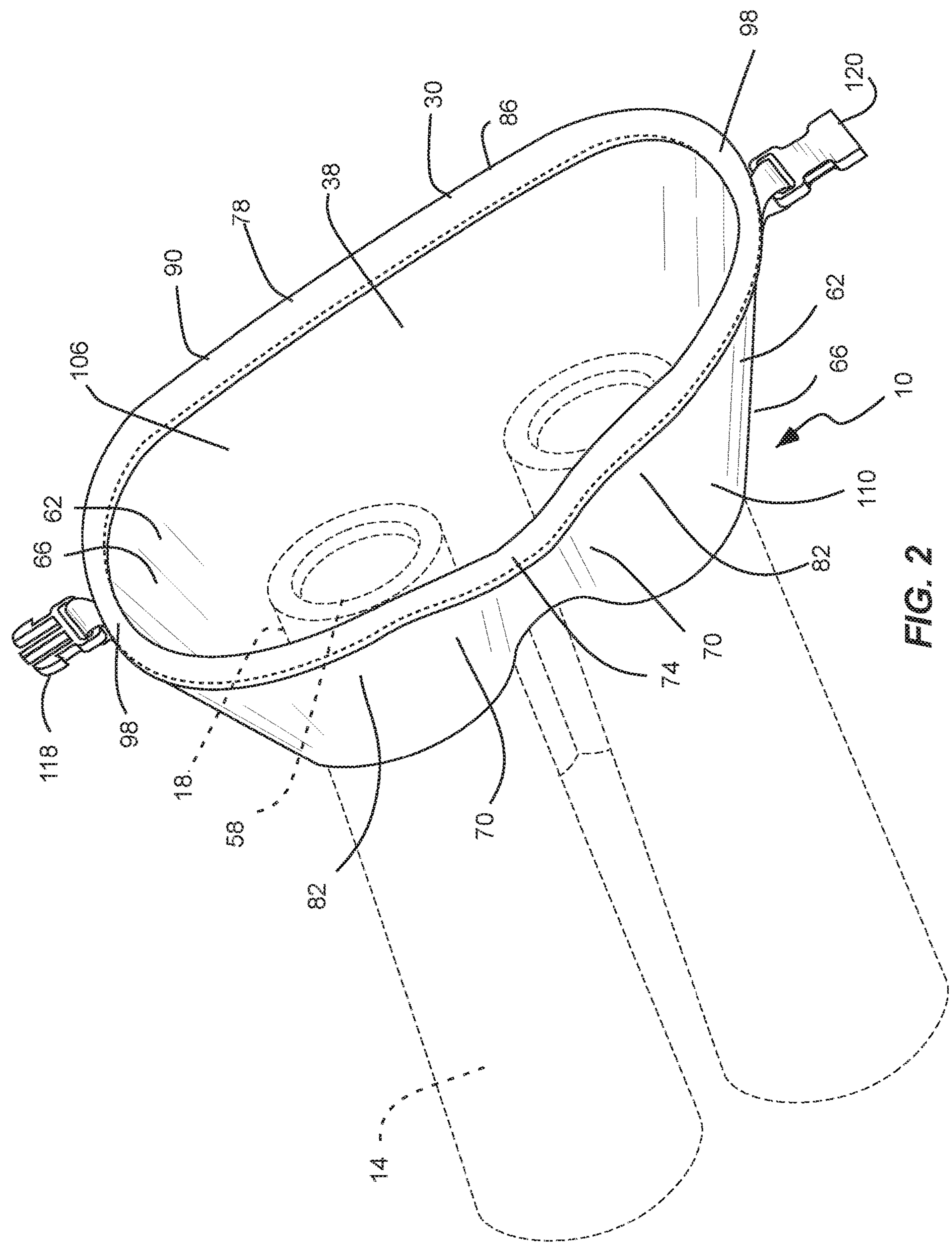
FIG. 2 is a rear perspective view of the eyepiece shield of FIG. 1, again shown in the open and/or use configuration.

FIG. 1 depicts the front perspective view of an embodiment of an eyepiece shield 10 for a sporting optic 14. Similarly, FIG. 2 depicts the rear perspective view of the eyepiece shield 10. By way of example, the sporting optic 14 is illustrated as binoculars or field glasses. Thus, the sporting optic 14 has a pair of eyepieces 18. The eyepiece shield 10 is shown coupled to the pair of eyepieces 18 of the sporting optic 18, described in greater detail below. The eyepiece shield 10 comprises an irregular frusto-conical shell 22. The shell 22 can be conically-shaped, and the conical-shape can be truncated, defining a substantial frustum. But the frustum can be irregularly shaped in that the truncated ends of the conical-shape are not parallel with one another. A proximal end of the shell can be perpendicular to a viewing axis and to match the eyepieces, while a distal end can be transverse to match a user's face. In addition, the conical-shape can be irregularly shaped because the shell can be laterally elongated to accommodate the pair of eyepieces, and/or both of the user's eyes. Furthermore, the shell 22 and/or the conical-shape can be irregular because walls or an exterior thereof can be convex or have a convex profile.

Figure 3:
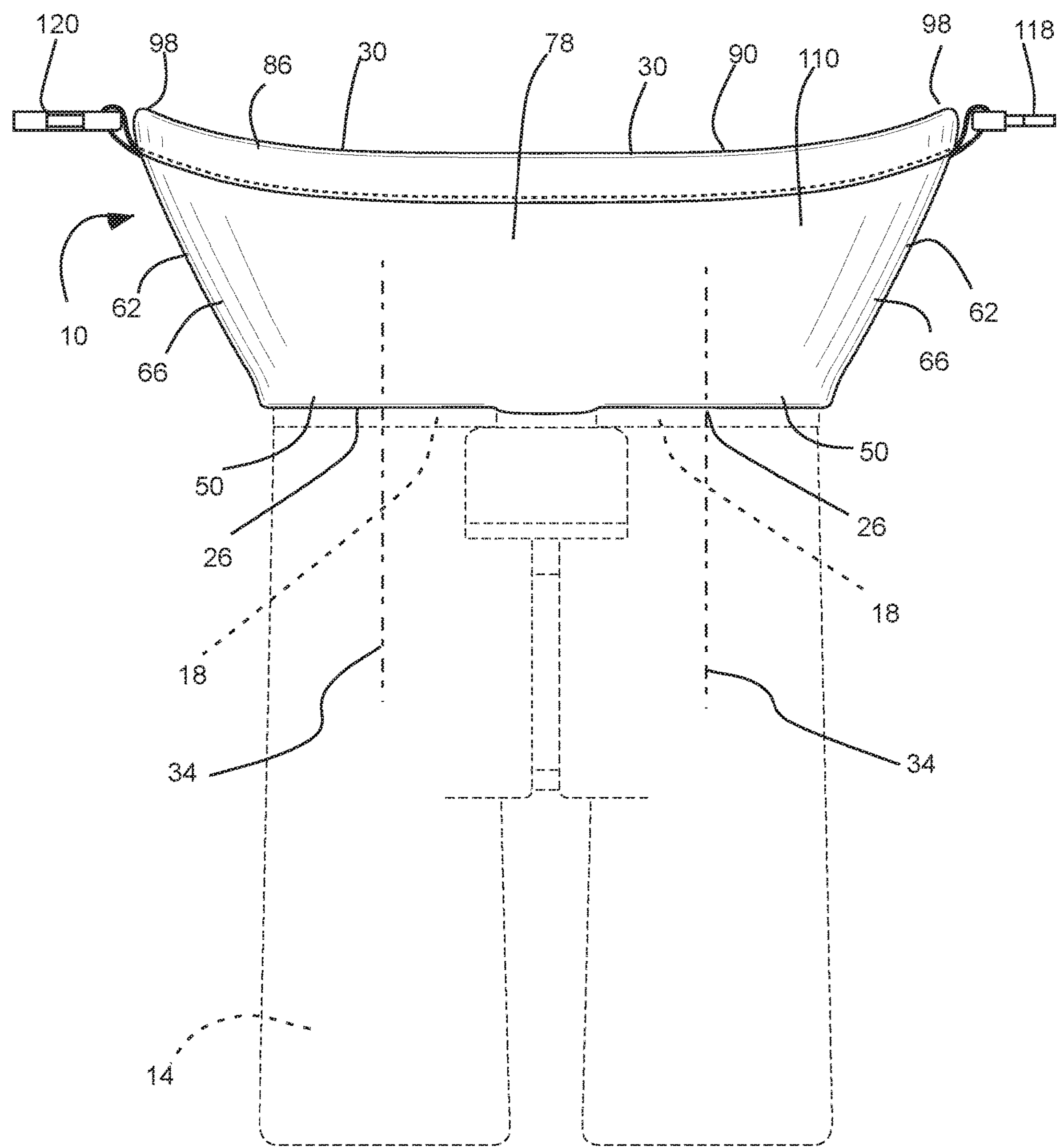
FIG. 3 is a top plan view of the eyepiece shield of FIG. 1.
Figure 4:
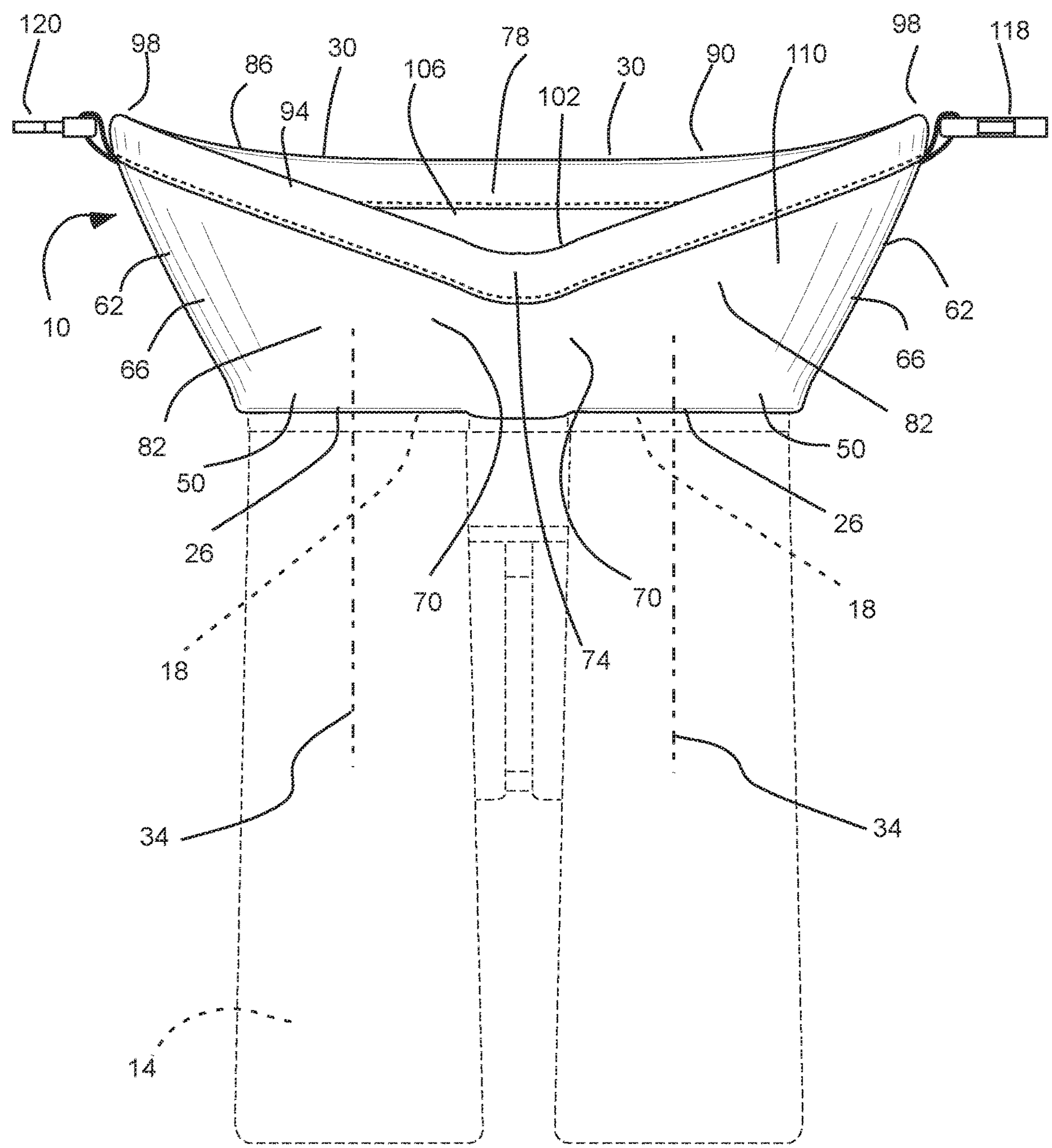
FIG. 4 is a bottom plan view of the eyepiece shield of FIG. 1.

The shell 22 has a narrower proximal end circumscribing a pair of eyepiece holes 26 that receive the pair of eyepieces 18 therein and/or therethrough. Thus, the proximal end of the shell 22 is coupled to the sporting optic 14. In one aspect, the shell 22 is removably coupled to the sporting optic 14, and eyepieces 18 thereof. In addition, the shell 22 has a wider distal end circumscribing an oblong eye opening 30. The eye opening 30 can have an oblong shape to more closely match the user's face adjacent the eyes, and to space both of the user's eyes. The eye opening 30 is non-parallel with the eyepiece holes 26 to more closely conform to the user's face. The eye opening 30 can receive the user's eye and/or face, and can abut to the user's face adjacent the eyes, during use. The distal end of the shell 22 and the eye opening 30 have a concave profile with respect to a viewing axis 34 between the eyepiece holes 26 and the eye opening 30, as shown in FIGS. 3 and 4. In one aspect, the eyepiece holes 26 can be orthogonal or perpendicular to the viewing axis 34, while the eye opening 30, or a portion thereof, can be transverse to the viewing axis 34. The eye opening 30 can be oblong because it spans the pair of eyepiece holes 26, and/or because it is transverse to the viewing axis 34. The viewing axis 34 of the shell 22 and the shield 10 can be parallel with the optical axis, or even the same as, a viewing axis of the sporting optic 14, or eyepieces 18 thereof.

In one aspect, the shell 22 comprises a flexible and resilient material. The material can be flexible to bend under an applied force, and resilient to return to its original shape and/or position when the force is removed. Thus, the material can be elastic. In addition, the material of the shell can be stiff enough to maintain its position and/or shape. In one aspect, the shell 22 and/or material thereof can comprise neoprene or a neoprene laminate with fabric. The flexible and resilient material can allow the eyepiece holes 26 to be easily stretched over the eyepieces 18 of the sporting optic 14 for installation. In addition, the flexible and resilient material can allow the shell 22 to be held in place by a friction fit between eyepiece holes 26 (or rings 50 thereof), and the eyepieces 18. The shell 22 and/or eyepiece holes 26 (or rings 50 thereof) can exert a radially inward directed force on the eyepieces 18. Furthermore, the flexible and resilient material can allow the shell 22 and/or the eye opening 30 to conform to the contours of the user's face to resist gaps.

In one aspect, the shell 22 and/or the material thereof can comprise a laminate, such as laminated or layered neoprene. The shell 22 and/or the material can have different inner and outer layers 38 and 42 sandwiching an intermediate foam layer 46. For example, the inner layer 38 can be plush, and the outer layer 42 can be moisture resistant. Thus, the plush inner layer 38 can protect the exposed lens of the eyepieces 18, while the moisture resistant outer layer 42 can resist moisture from absorbing into the intermediate or inner layers 46 and 38. In addition, the moisture resistant outer layer 42 can resist moisture from entering the shell 22 and causing the lens of the eyepieces 18 to fog. The inner and outer layers 38 and 42 can be fabric. The intermediate foam layer 46 can be compressible, and can have a cellular structure, such as neoprene. Thus, the intermediate layer 46 can provide a comfortable, cushioned feel against the user's face.

In one aspect, the shell 22 and/or the shield 10 has rings 50 circumscribing each of the eyepiece holes 26. The rings 50 are formed by the flexible and resilient material of the shell 22, and circumscribe the eyepiece holes 26, and the eyepieces 18 of the sporting optic 14. In addition, the shell 22 and/or the shield 10 can have a pair of seams 54, one on each side, in the flexible and resilient material of the shell, and which can be used to form the shell 22, as described below. The seams 54 can extend from a perimeter of the eye opening 30 to adjacent the rings 50, respectively, without intersecting the eyepiece holes 26, and without bisecting the rings 50. The rings 50 continuously circumscribe the eyepiece holes 26 without interruption by the seams 54. Thus, when the eyepiece holes 26, and thus the rings 50, are stretched over the eyepieces 18 of the sporting optic 14, the stress and force extends through the material of the rings 50, without exerting stress and force on the seams 54.

In one aspect, the eyepiece shield 10 and the shell 22 thereof can be removably coupled to the sporting optic 14 and the eyepieces 18 thereof, as mentioned above. The eyepiece holes 26 can be sized smaller than the eyepieces 18 of the sporting optic 14. Thus, the eyepiece holes 26 can be stretched over the eyepieces 18 of the sporting optic 14 to removably couple the shell 22 and/or the shield 10 to the sporting optic, and to create a friction-fit between the eyepiece holes 26, and/or rings 50, and the eyepieces 18 to hold the shell 22 and/or the shield 10 in place.

In another aspect, the eyepiece shield 10 and the shell 22 thereof can be removably coupled to the sporting optic 14 and the eyepieces 18 thereof with the eyepiece holes 26 on the eyepiece 18 of the sporting optic 14 disposed between eyecups 58 and the eyepieces 18. For example, the eyecups 58 can be removed from the eyepieces 18, the eyepiece holes 26 of the shell 22 inserted over the eyepieces 18, and the eyecups 58 replaced.

Figure 5:
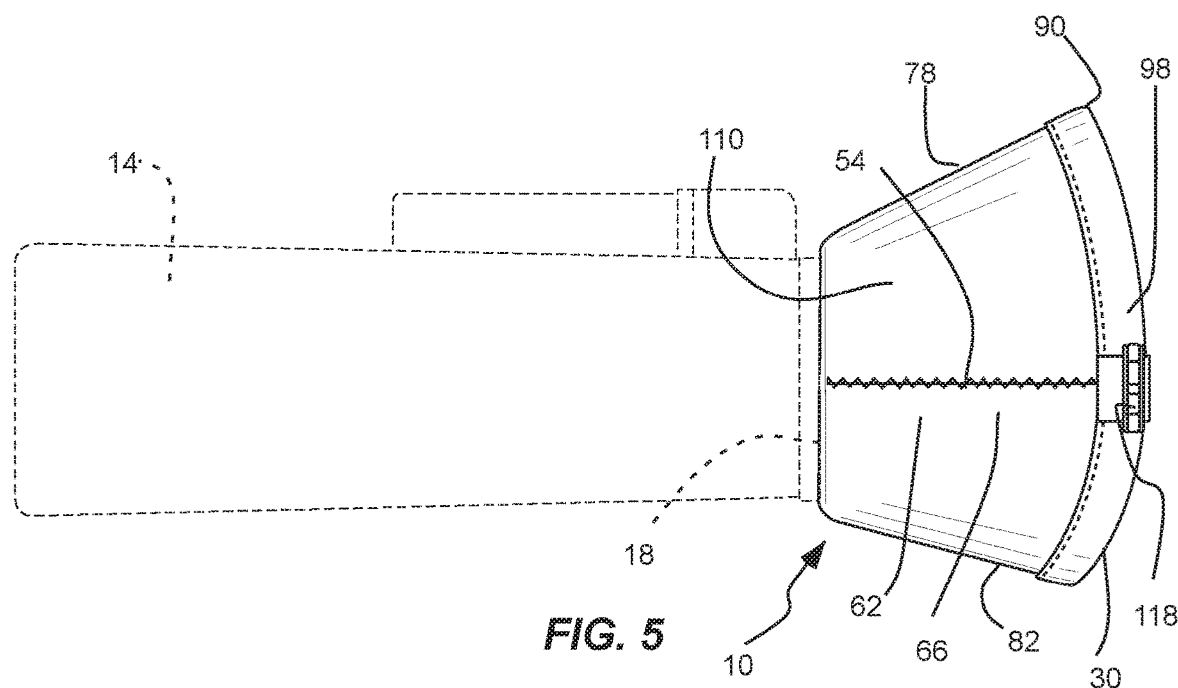
FIG. 5 is a left side elevation view of the eyepiece shield of FIG. 1, again shown in the open and/or use configuration.
Figure 6:
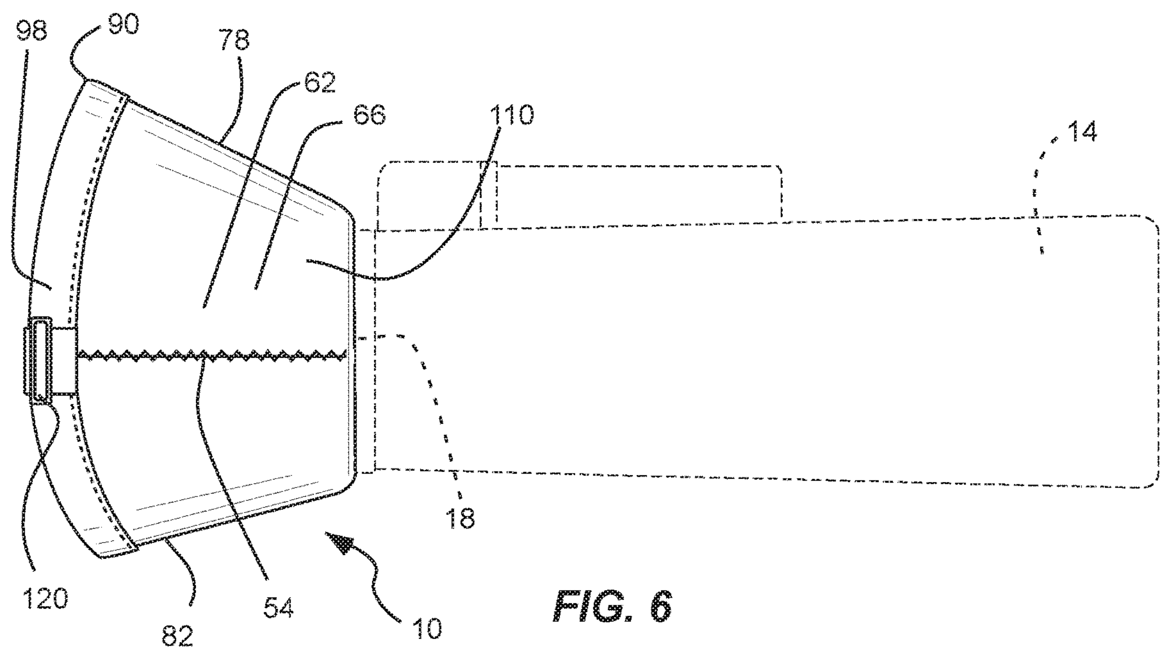
FIG. 6 is a right side elevation view of the eyepiece shield of FIG. 1.
Figure 7:
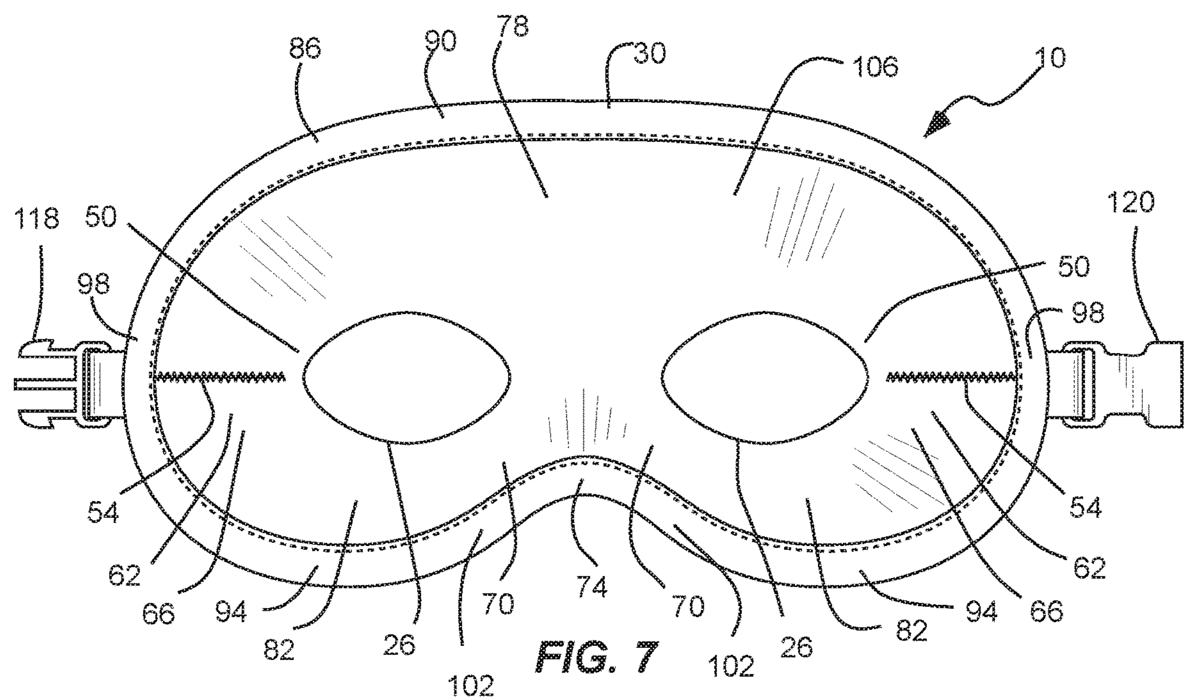
FIG. 7 is a rear elevation view of the eyepiece shield of FIG. 1, shown removed from the sporting optic, and also showing a method for making the eyepiece shield, and showing fastener portions being joined to a shell.
Figure 8:
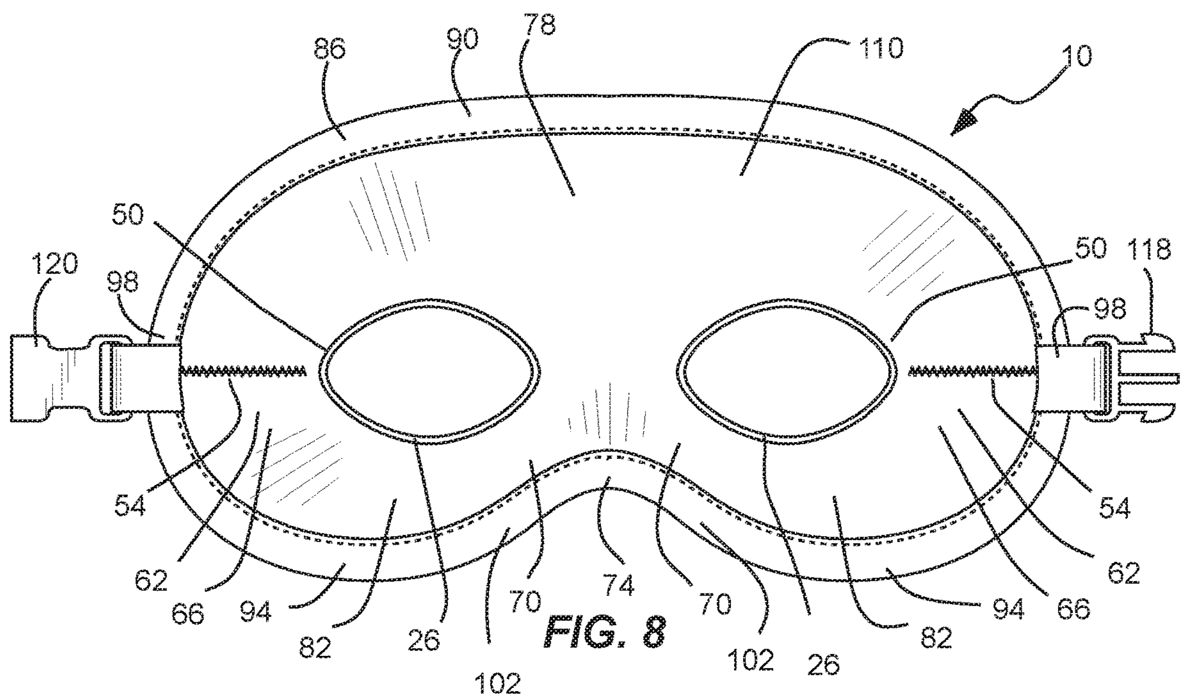
FIG. 8 is a front elevation view of the eyepiece shield of FIG. 1, shown removed from the sporting optic.

FIG. 3 depicts the top plan view of the eyepiece shield 10. FIG. 4 depicts the bottom plan view of the eyepiece shield 10. FIG. 5 depicts the left side elevation view of the eyepiece shield 10. FIG. 6 depicts the right side elevation view of the eyepiece shield 10. FIG. 7 depicts the rear elevation view of the eyepiece shield 10, removed from the sporting optic 14. And FIG. 8 depicts the front elevation view of the eyepiece shield 10, removed from the sporting optic 14. The shell 22 and/or the shield 10 can comprise multiple different walls with different shapes, sizes, and/or orientations. The walls can together form a contoured edge of the eye opening 30. The shell 22 comprises a pair of longer exterior side walls 62 extending radially outwardly and longitudinally rearwardly from the rings 50 and the eyepiece holes 26, and defining a pair of lateral lobes 66 to extend adjacent a user's eye, or laterally thereof. In addition, the shell 22 comprises a pair of shorter inner side walls 70 extending radially outwardly (with respect to a respective viewing axis 34) and longitudinally rearwardly from the rings 50, respectively, defining a nosepiece 74 to abut to a user's nose. Each inner side wall 70 extends radially outwardly with respect to a respective ring 50, but extend inward with respect to, and towards, one another. The inner side walls 70 are shorter than the exterior side walls 62. Thus, the exterior side walls 62 are longer to extend to the user's temples, while the inner side walls 70 are shorter to extend to the user's nose.

In addition, the shell 22 comprises a longer upper wall 78 extending radially outwardly and longitudinally rearwardly from the rings 50. The upper wall 78 can abut to the user's forehead. The upper wall 78 can be shorter than the exterior side walls 62. In addition, the shell 22 comprises a shorter lower wall 82 (or pair of lower walls between the exterior side walls 62 and the inner side walls 70) extending radially outwardly and longitudinally rearwardly from the rings 50. The lower wall(s) 82 can abut to the user's cheeks. The lower wall 82 is shorter than the upper wall 78. A perimeter of the eye opening 30 is formed by the distal ends of the walls 62, 70, 78 and 82 of the shell 22. The distal ends of the walls have a continuous edge 86 shaped or contoured to the user's face. The continuous edge 86 has: 1) an upper forehead edge 90 to abut to a user's forehead; 2) a lower check edge 94 (or pair of check edges) to abut to a user's cheeks; 3) an exterior edge 98 (or pair of exterior edges) to abut to a user's temples; and 4) an interior edge 102 to abut to a user's nose. Thus, the shell 22, and the walls and continuous edge 86 thereof, can be shaped or contoured to substantially match a user's face. In addition, the shell 22 is flexible to conform to the user's face. The eye opening 30 of the shell 22 is broad and wider than the pair of eyepiece holes 26, and laterally spans the user's eyes, and the pair of eyepiece holes 26. Thus, the eye opening 30 can be more comfortable, and less claustrophobic to use.

Figure 14:
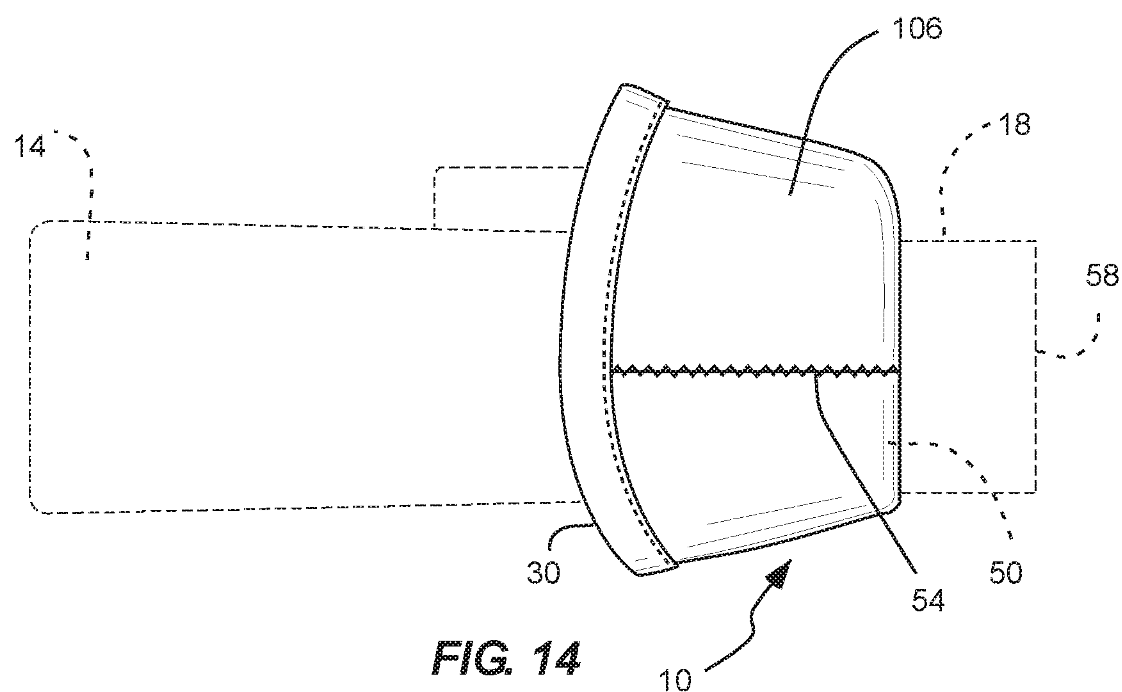
FIG. 14 is a left side elevation view of the eyepiece shield of FIG. 1, shown in a storage configuration.

FIG. 5 depicts a left side elevation view of the eyepiece shield 10, shown in a use configuration. FIG. 14 depicts a left side elevation view of the eyepiece shield 10, shown in an inverted storage configuration. The shell 22 and/or the shield 10 has an interior 106 (FIG. 14) and an exterior 110 (FIG. 5). In one aspect, the shell 22 and/or the shield 10 has at least two configurations, including: 1) a use configuration (FIG. 5); and 2) a storage configuration (FIG. 14). In the use configuration, the eye opening 30 is located rearwardly of the rings 50, and the exterior 110 faces outwardly and the interior 106 faces inwardly. In the use configuration, the shell 22 extends between the eyepiece 18 of the sporting optic 14 and a user's face. In the storage configuration, the shell 22 is folded back onto itself with the eye opening 30 located forwardly of the rings 50, and with a portion of the shell 22 circumscribing the rings 50 and exposing the interior 106 of the shell so that the interior 106 faces outwardly and the exterior 110 faces inwardly. In the storage configuration, the shell is positioned to circumscribe the sporting optic 14, and can be inverted with respect to the use configuration. Thus, when not in use, the shield 10 can be folded into the inverted storage configuration to resist the shield and/or shell from catching on objects, or to resist acting as a bowl to collect foreign objects.

Figure 9:
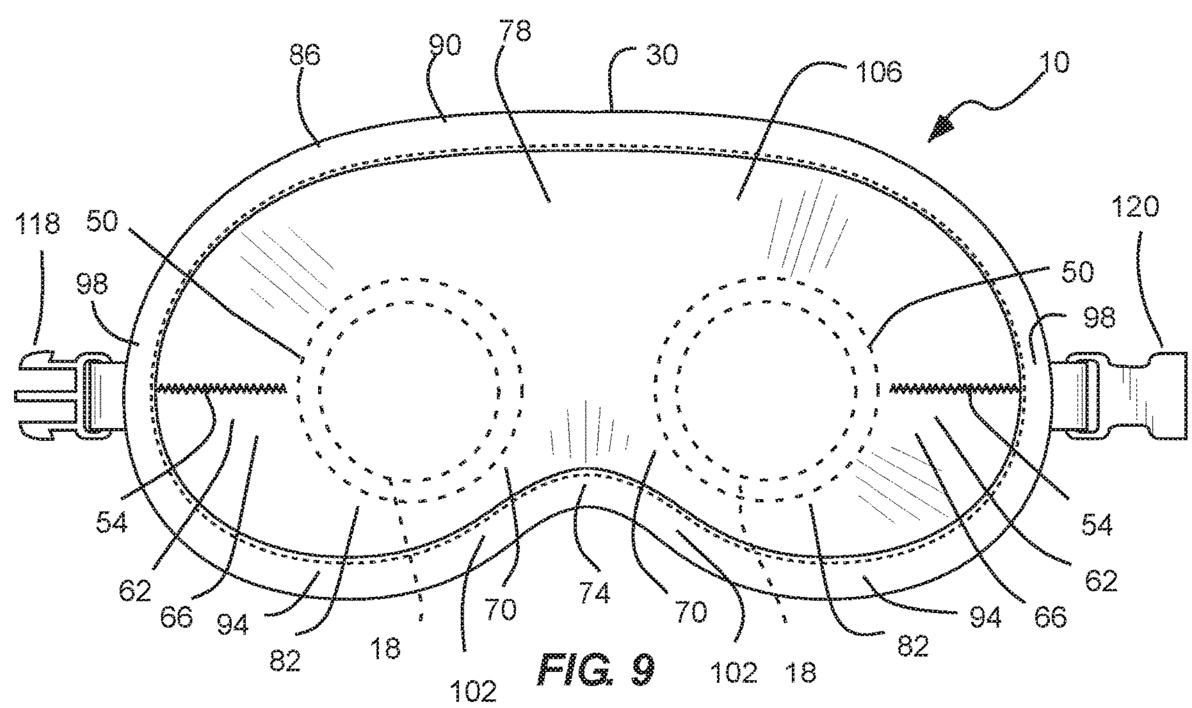
FIG. 9 is a rear elevation view of the eyepiece shield of FIG. 1, shown on the sporting optic, and shown in the open and/or use configuration.
Figure 15:
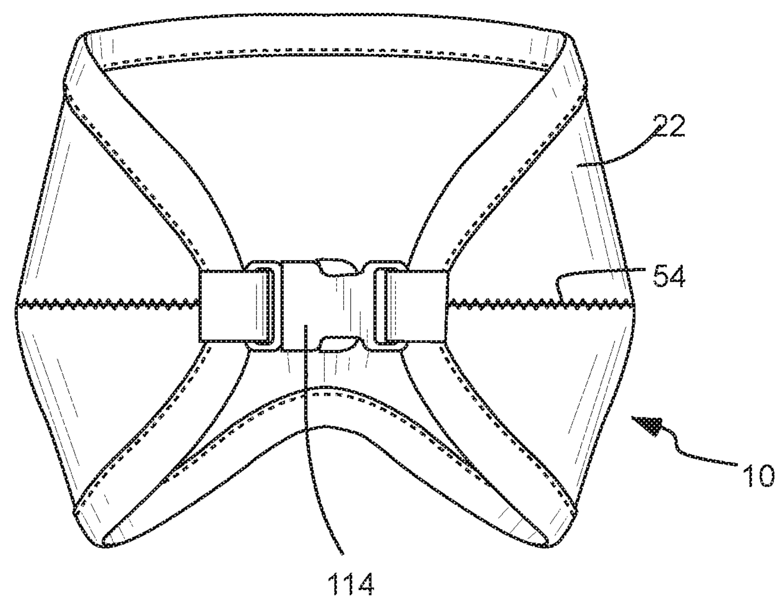
FIG. 15 is a rear elevation view of the eyepiece shield of FIG. 1, shown in a closed configuration.

FIG. 9 depicts the rear elevation view of the eyepiece shield 10, shown in an open configuration. FIG. 15 depicts the rear elevation view of the eyepiece shield 10, shown in a closed configuration. The shield 10 and/or the shell 22 has a fastener 114 with first and second fastener portions 118 and 120 carried on opposite sides of the shell 22 at the eye opening 30, respectively. In one aspect, the fastener 114 can be or can comprise a pinch side release buckle/clip, as shown. In another example, the fastener can be a hook-and-loop type fastener, a snap type fastener, a hook, a button-and-loop, etc. The shell 22 and/or the shield 10 has at least two configurations, including: 1) an open configuration (FIG. 9), and 2) a closed configuration (FIG. 15). In the open configuration, the eye opening 30 is open, and the fastener 114 is unfastened with the first and second fastener portions 118 and 120 separated. Thus, the shield 10 and the shell 22 are open and the user can view the eyepieces therethrough. In the closed configuration, the opposite sides of the eye opening 30 are folded in towards one another, and the fastener 114 is fastened with the first and second fastener portions 118 and 120 joined together. Thus, the shell 22 can be closed over the eyepieces 18 to protect the eyepieces or lenses therein. In addition, the eye opening 30 the shield 10 or shell 22 is substantially closed in the closed configuration to resist accumulation of debris.

Figure 10:
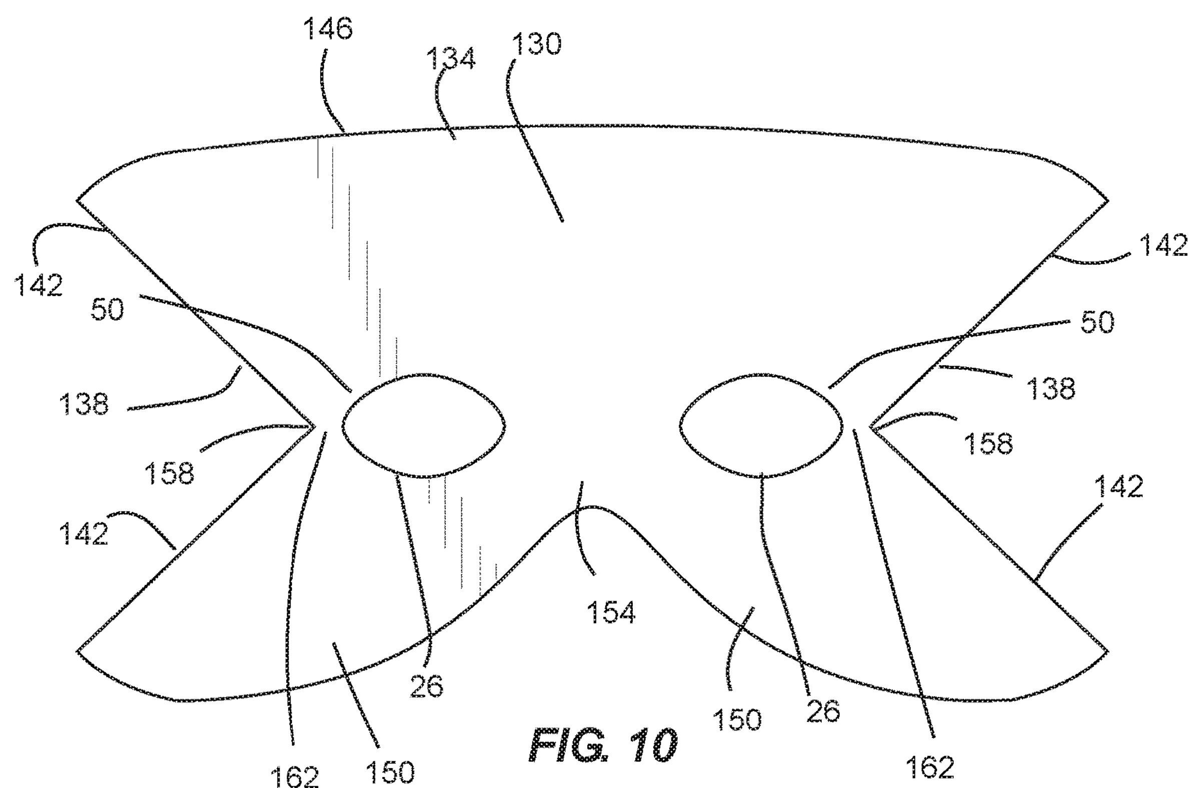
FIG. 10 is a top view of a sheet of material cut into a precursor blank in accordance with an embodiment of the invention and showing a method for making the eyepiece shield of FIG. 1.

FIGS. 10-13 and 7 show a method for making the eyepiece shield 10, as described above and below. The method comprises cutting a precursor blank 130 from a sheet of material 134, as shown in FIG. 10. The precursor blank 130 can be a single continuous sheet. In addition, the precursor blank 130 can have a perimeter with notches 138 with opposing sides 142. In addition, the perimeter can have a forehead portion 146, a cheek portion(s) 150 and a nose portion 154. The notches 138 interrupt the forehead and cheek portions 146 and 150. In addition, the method comprises cutting apertures 26 in the precursor blank 130 or the sheet of material 134, with the apertures 26 being contained within the perimeter, as shown in FIG. 10. The sheet of material can be or can comprise neoprene or laminated neoprene, as described above. In one aspect, cutting the precursor blank 130 and cutting apertures 26 can further comprise simultaneously stamping the precursor blank 130 and the apertures 26 from the sheet of material 134. In another aspect, cutting the apertures 26 can further comprise cutting the apertures 26 spaced-apart from an apex 158 of the notches 134 by a neck 162. Thus, the perimeter is uninterrupted by the apertures. The neck 162 also forms a portion of the rings 50.

Figure 11:
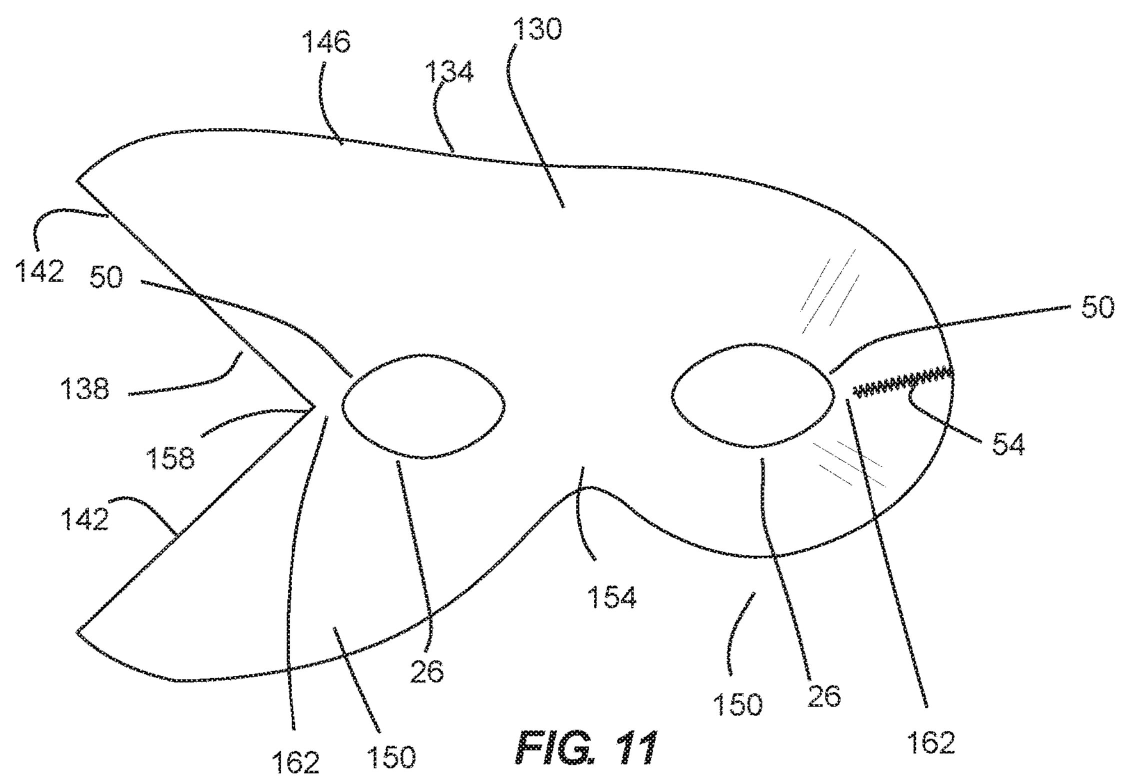
FIG. 11 is a top view of sheet of material of FIG. 10, showing the method for making the eyepiece shield, and showing a notch of the precursor blank being joined to form a shell.
Figure 12:
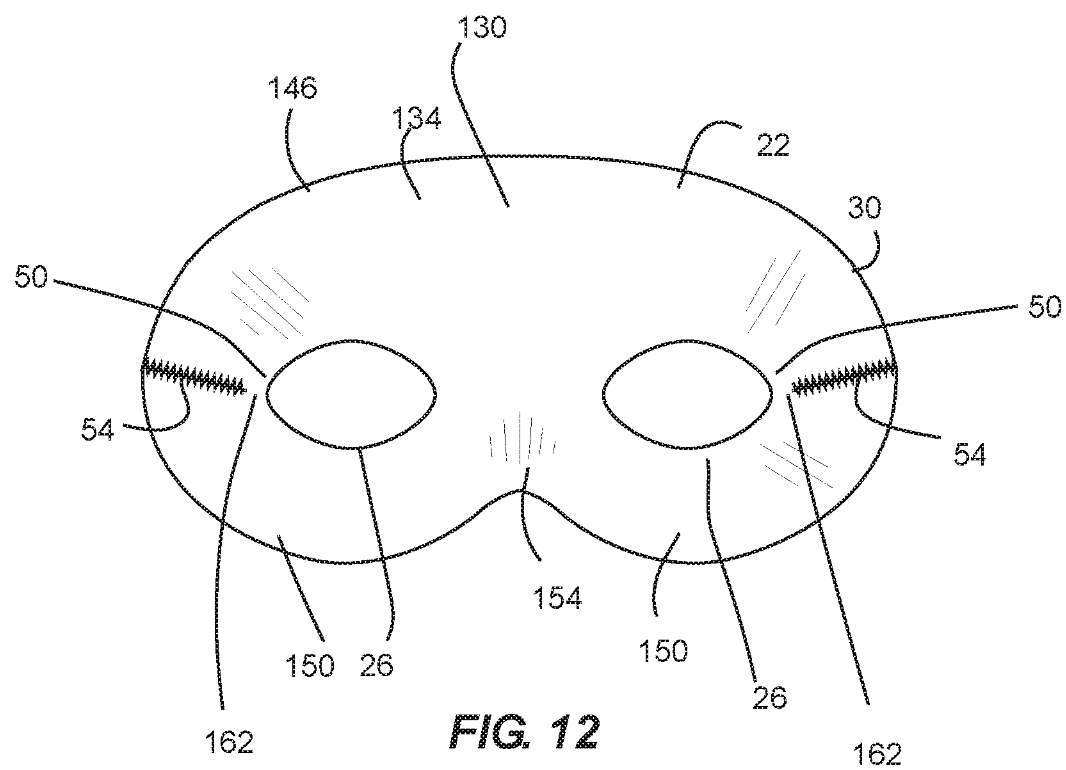
FIG. 12 is a top view of sheet of material of FIG. 10, showing the method for making the eyepiece shield, and showing another notch of the precursor blank being joined to further form the shell.

In addition, the method comprises joining the opposing sides 142 of the notches 138 together, as shown in FIGS. 11 and 12. Joining the opposing sides 142 of the notches 138 also forms the irregular frusto-conical shell 22, with the narrower end circumscribing the aperture 26, defining eyepiece holes 22 to receive the eyepieces 18 therein, and forms the wider end circumscribing oblong eye opening 30 that is non-parallel with the eyepiece holes 26, and having the concave profile with respect to the viewing axis. The precursor blank 130 becomes the shell 22 when the notches 138 are gathered together and joined. Cutting the precursor blank 130 from a single sheet of material 134, and positioning the apertures 26 outside the notches, allows the formation of the rings 50, as described above.

Figure 13:
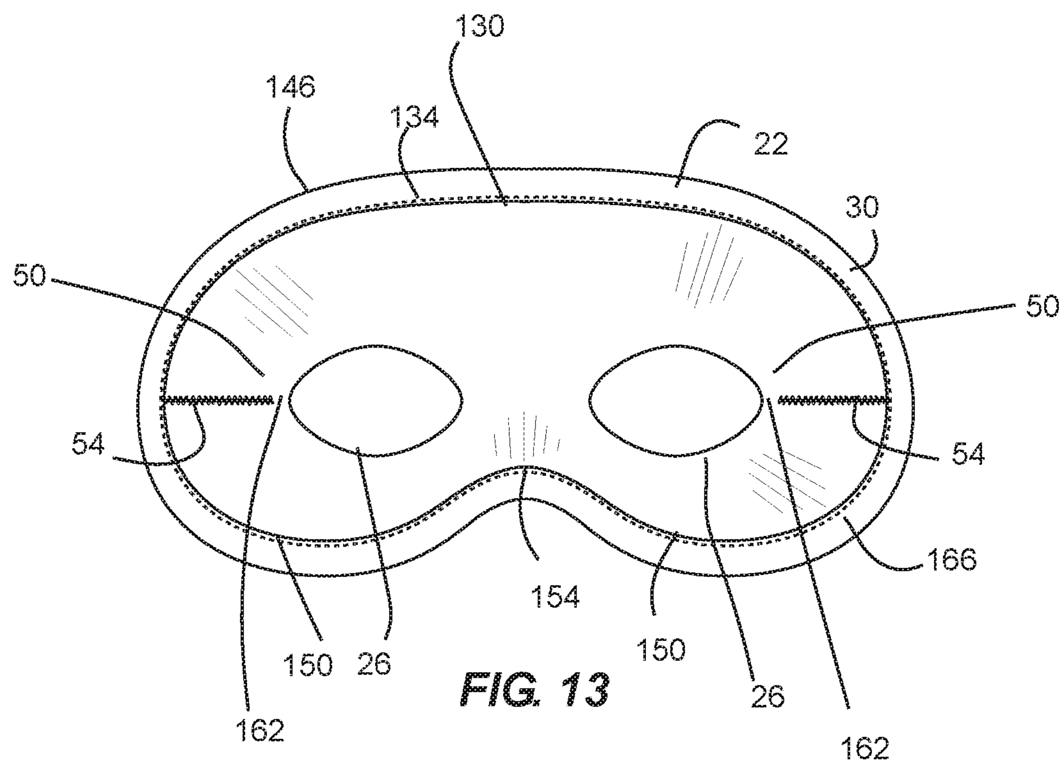
FIG. 13 is a top view of sheet of material of FIG. 10, showing the method for making the eyepiece shield, and showing a biasing tape secured around an eye opening.

In addition, the method can further comprise securing bias taping 166 around the eye opening 30, as shown in FIG. 13. Furthermore, the method can further comprise joining the first and second fastener portions 118 and 120 to the opposite sides of the shell 22, as shown in FIG. 7. The fastener portion 118 and 120 can be joined by webbing.

FIG. 7 depicts the eyepiece shield 10 removed from the sporting optic 14; while FIG. 9 depicts the eyepiece shield 10 secured to the sporting optic 14. A method for shielding the eyepieces 18 of the sporting optic 14, and for using the eyepiece shield 10 described above and below, comprises removably securing the shield 10 to the sporting optic 14 and eyepieces 18 thereof. The method comprises stretching eyepiece holes 26 of the eyepiece shield 10 over the eyepieces 18 of the sporting optic 14 with the eyepiece holes 26 circumscribing the eyepiece 18. The eyepiece shield 10 and the eyepiece holes 26 are held in place by a friction-fit between the eyepiece holes 26 and the eyepieces 18. In addition, the method comprises abutting the oblong eye opening 30 against a user's face while looking through the eyepiece shield 10 and the eyepieces 18 of the sporting optic 14.

In one aspect, the eyepiece shield 22 can be in the use configuration. The method can further comprise folding or inverting the eyepiece shield 10 over itself, and over the sporting optic 14, as shown in FIG. 14. The method can further comprise unfolding the eyepiece shield back to the use configuration, as shown in FIG. 5.

In another aspect, the eyepiece shield 22 can be in the open configuration. The method can further comprise folding opposite lateral sides of the eye opening 30 together over the eyepieces 18 of the sporting optic 14, and clipping the opposite lateral sides of the eye opening 30 together with the fastener 114 to hold the opposite lateral sides together, as shown in FIG. 15. In addition, the method can further comprise releasing the fastener 114 and separating the opposite lateral sides to expose the eyepieces 18 of the sporting optic 14, as shown in FIG. 7. As described above, the material of the shell 22 and/or the shield 10 can be resilient or elastic to bias the shell 22 and/or the shield 10 in the open configuration.

In another aspect, the method can comprise removing the eyecups 58 from the eyepieces 18 of the sporting optic 14; inserting the eyepieces 18 through the eyepiece holes 26 of the eyepiece shield 10; and replacing the eyecups 58 on the eyepieces 18.

The eyepiece shield 10 described above has been configured for the sporting optic 14 having a pair of eyepieces 18. The eyepiece shield can be configured for a sporting optic with a single eyepiece. Thus, the eyepiece shield has at least one eyepiece hole.

The eyepiece shield 10 has thus been described for use with the sporting optic 14 having dual eyepieces 18. The eyepiece shield can also be configured for use with a sporting optic having a single eyepiece. Thus, the eyepiece shield has at least one eyepiece hole.

Figure 16:
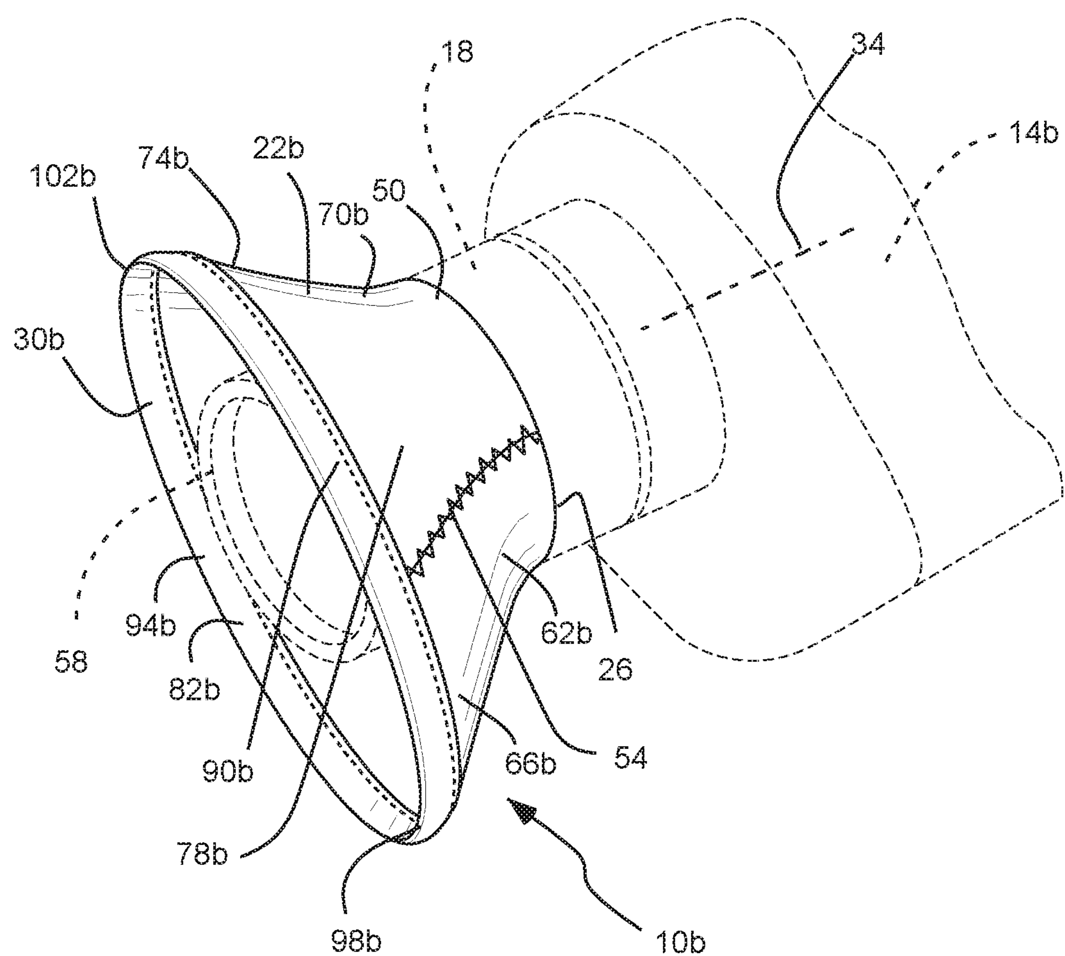
FIG. 16 is a rear perspective view of another eyepiece shield in accordance with an embodiment of the invention, shown coupled to a sporting optic, namely a monocular or a spotting scope by way of example.
Figure 17:
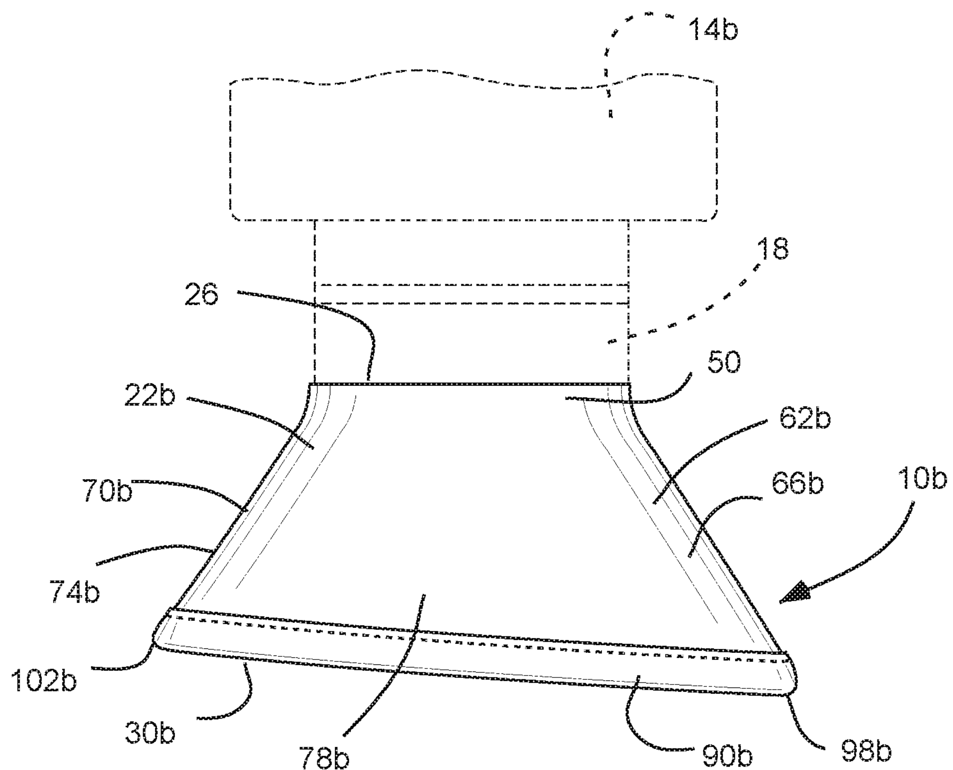
FIG. 17 is a top plan view of the eyepiece shield of FIG. 16.
Figure 18:
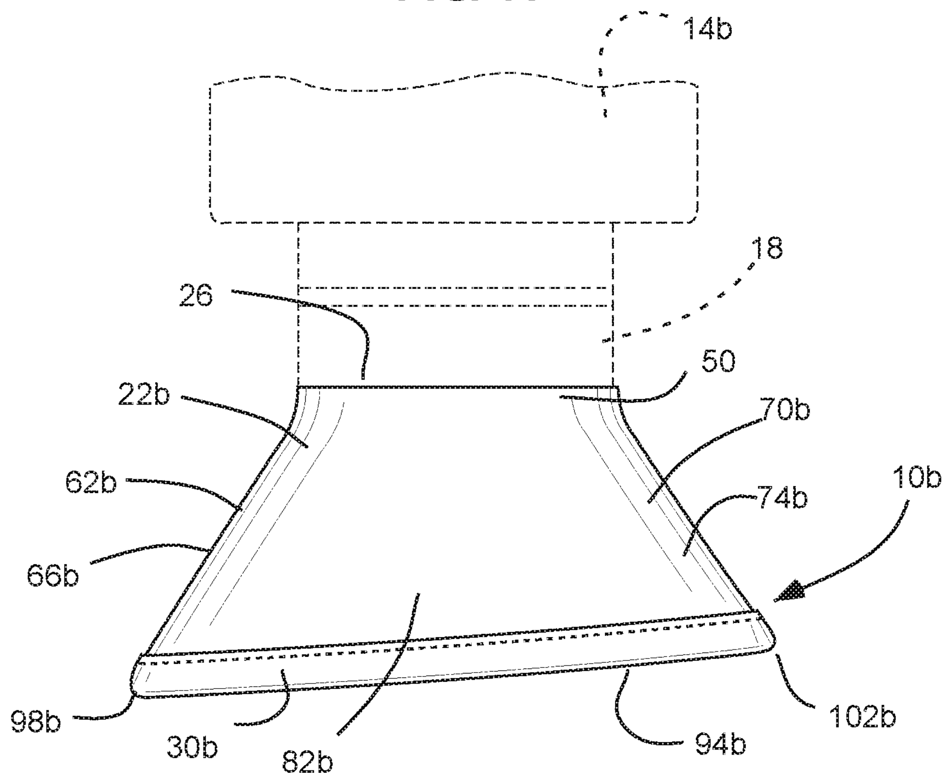
FIG. 18 is a bottom plan view of the eyepiece shield of FIG. 16.
Figure 19:
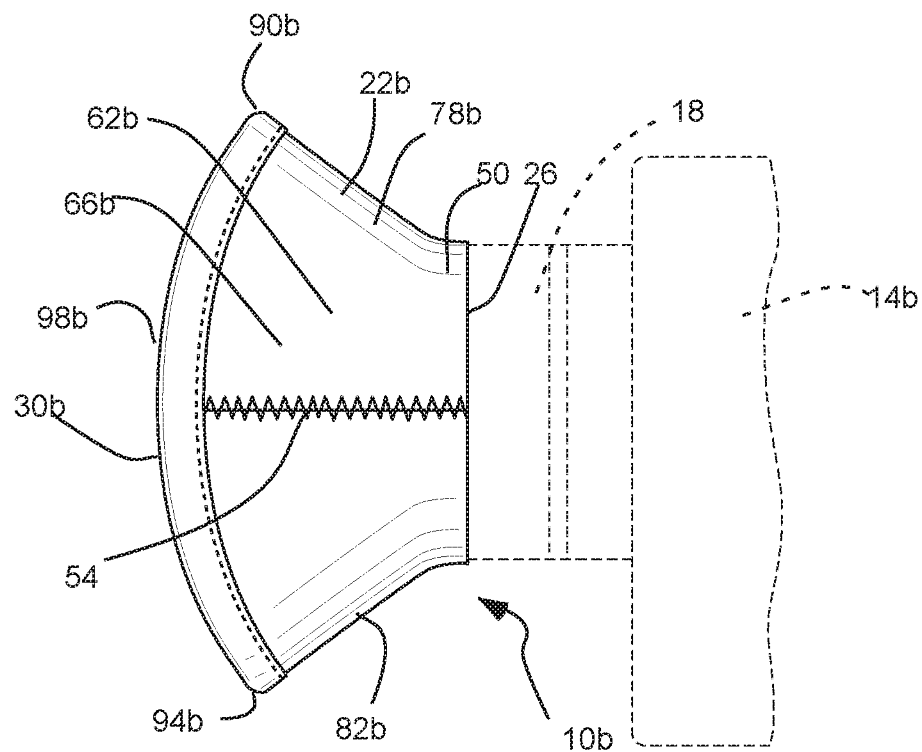
FIG. 19 is a right side elevation view of the eyepiece shield of FIG. 16.
Figure 20:
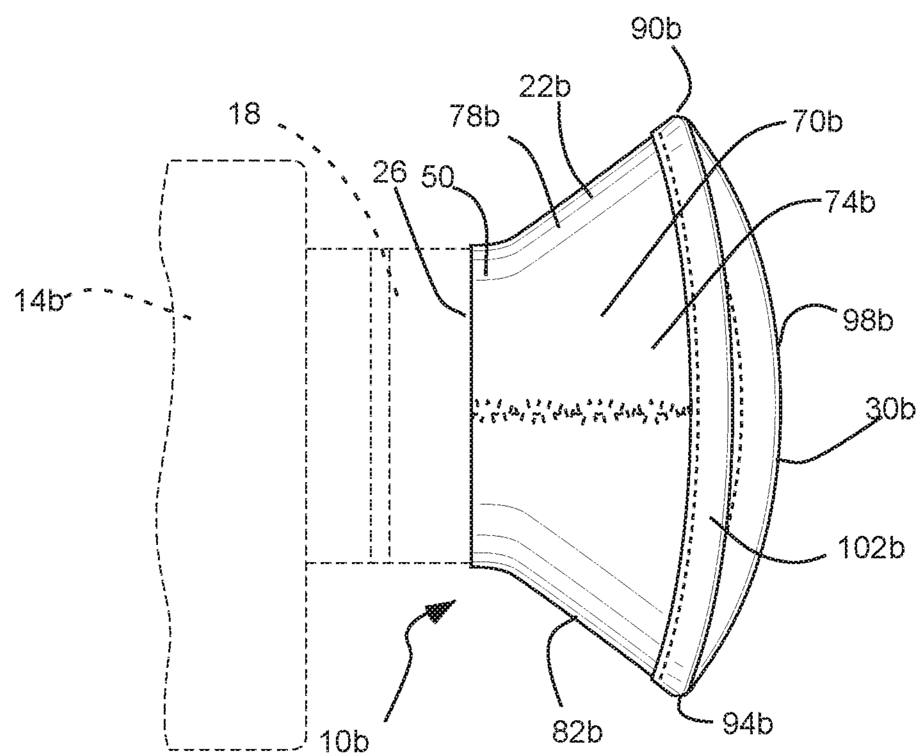
FIG. 20 is a left side elevation view of the eyepiece shield of FIG. 16.
Figure 21:
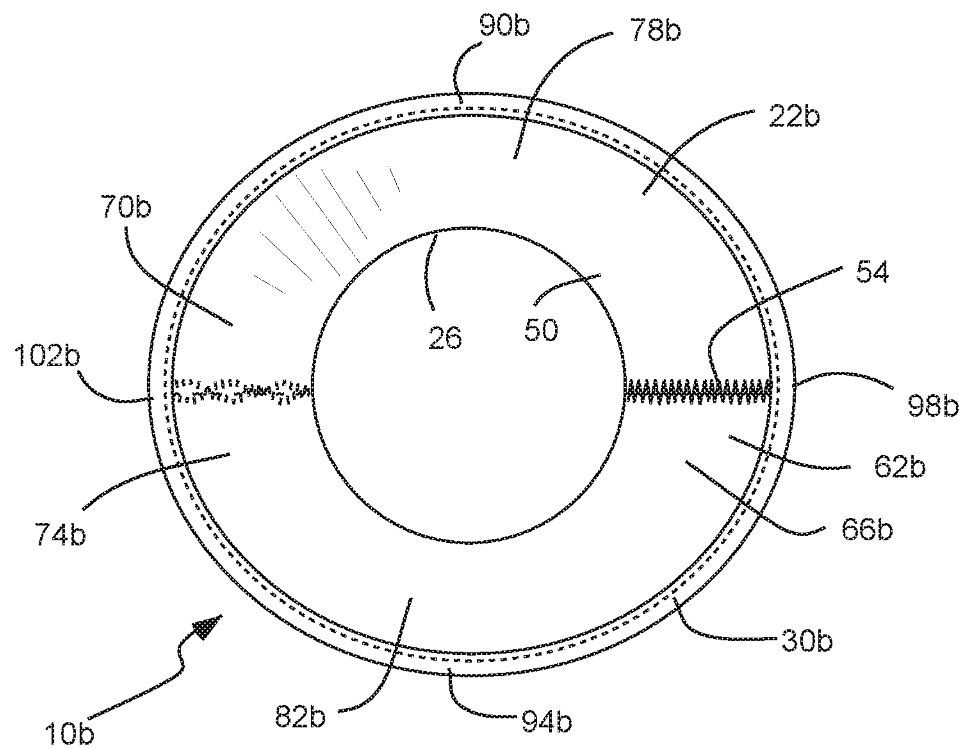
FIG. 21 is a rear elevation view of the eyepiece shield of FIG. 16.
Figure 22:
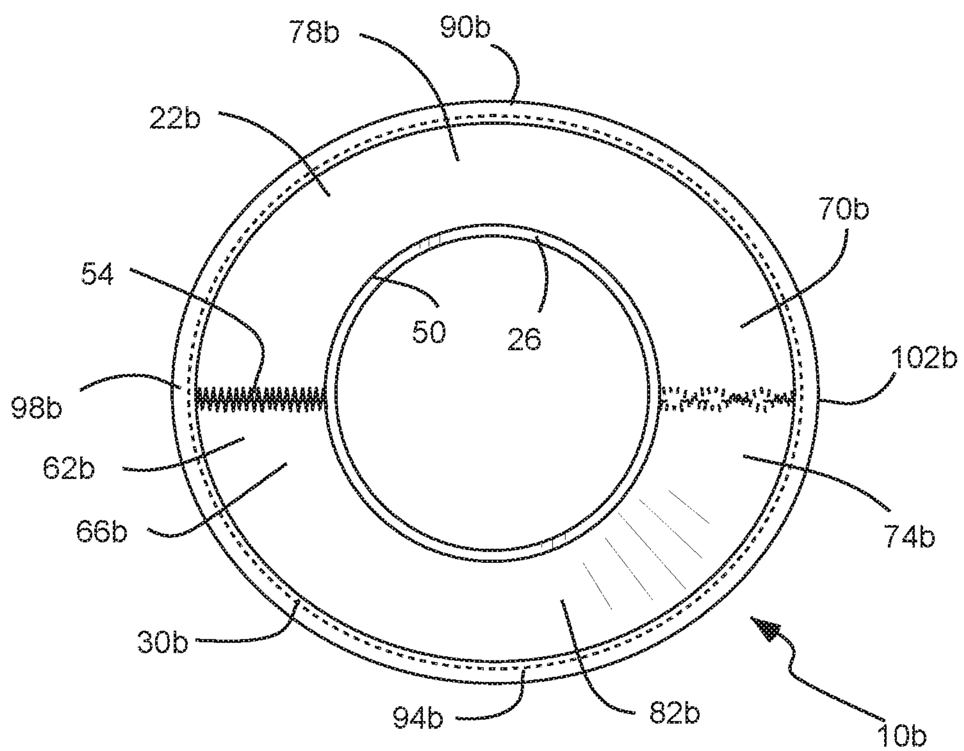
FIG. 22 is a front elevation view of the eyepiece shield of FIG. 16.

FIG. 16 depicts the rear perspective view of another eyepiece shield 10*b* in accordance with another embodiment of the invention, shown coupled to a sporting optic 14*b*, namely a monocular or a spotting scope by way of example. FIG. 17 depicts the top plan view of the eyepiece shield 10*b*. FIG. 18 depicts the bottom plan view of the eyepiece shield 10*b*. FIG. 19 depicts the right side elevation view of the eyepiece shield 10*b*. FIG. 20 depicts the left side elevation view of the eyepiece shield 10*b*. FIG. 21 depicts the rear elevation view of the eyepiece shield 10*b*. FIG. 22 depicts the front elevation view of the eyepiece shield 10*b*. The sporting optic 14*b* has a single eyepiece 18, and the eyepiece shield 10*b* can be configured for use with a single eye of the user. The eyepiece shield 10*b* is similar in many respects to the eyepiece shield 10 described above, and which description is hereby incorporated herein by reference.

The shield 10*b* comprises an irregular frusto-conical shell 22*b* with a narrower end circumscribing at least one eyepiece hole 26, and a wider end circumscribing an oblong eye opening 30*b* that is non-parallel with the eyepiece hole 26, and having a concave profile with respect to a viewing axis 34 between the eyepiece hole 26 and the eye opening 30*b*. The eye opening 30*b* can be smaller than that described above, for user with a single eye of the user. As described above, the shell comprises a flexible and resilient material. The shell 22*b* has a ring 50 circumscribing the eyepiece hole 26, and formed by the flexible and resilient material of the shell. The shell 22*b* and/or shield 10*b* comprises at least one seam 54 in the material, and extending from a perimeter of the eye opening 30*b* to adjacent the ring 50, without intersecting the at least one eyepiece hole 26. The ring 50 continuously circumscribes the at least one eyepiece hole 26 without interruption by the seam 54. In one aspect, the eyepiece shield 10*b* and/or the shell 22*b* can have single seam 54 as shown in solid lines. In another aspect, the eyepiece shield 10*b* and/or the shell 22*b* can have a second seam, opposite the first, as shown in dashed lines in FIGS. 20-22.

Similar to that described above, the shell 22*b* and/or the shield 10*b* comprises a longer exterior side wall 62*b* extending radially outwardly and longitudinally rearwardly from the ring 50, defining a lateral lobe 66*b* to extend adjacent a user's eye; a shorter inner side wall 70*b* extending radially outwardly and longitudinally rearwardly from the ring 50, defining a nosepiece 74*b* to abut to a user's nose. Again, the inner side wall 70*b* is shorter than the exterior side wall 62*b*. The shell 22*b* and/or the shield 10*b* also comprises a longer upper wall 78*b* extending radially outwardly and longitudinally rearwardly from the ring 50; and a shorter lower wall 82*b* extending radially outwardly and longitudinally rearwardly from the ring 50. Again, the lower wall 82*b* is shorter than the upper wall 78*b*. The perimeter of the eye opening 30*b* is formed by the walls of the shell 22*b* and has a continuous edge to shape to the user's face, including: 1) an upper forehead edge 90*b* to abut to a user's forehead; 2) a lower check edge 94*b* to abut to a user's cheek; 3) an exterior edge 98*b* to abut to a user's temple; and 4) an interior edge 102*b* to abut to a user's nose.

As described above, the shield 10*b* and/or the shell 22*b* has an open and use configuration, as well as a closed configuration, and an inverted storage configuration. Thus, the shield 10*b* and/or the shell 22*b* can have the fastener and fastener portions as described above.

The shield 10*b* can be made and used as described above.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An eyepiece shield configured for a sporting optic with dual eyepieces, the eyepiece shield comprising:

a) an irregular frusto-conical shell with a narrower end circumscribing a pair of eyepiece holes, and a wider end circumscribing an oblong eye opening that is non-parallel with the eyepiece holes and having a concave profile with respect to a viewing axis between the eyepiece holes and the eye opening;

b) the shell having a pair of rings circumscribing the pair of eyepiece holes, respectively;

c) a pair of longer exterior side walls of the shell extending radially outwardly and longitudinally rearwardly from the pair of rings, respectively, defining a pair of lateral lobes configured to extend adjacent a user's eyes;

d) a pair of shorter inner side walls of the shell extending radially outwardly and longitudinally rearwardly from the pair of rings, respectively, defining a nosepiece therebetween configured to abut to a user's nose, the pair of inner side walls being shorter than the pair of exterior side walls;

e) a longer upper wall of the shell extending radially outwardly and longitudinally rearwardly from the pair of rings between the pair of exterior side walls;

f) a shorter lower wall of the shell extending radially outwardly and longitudinally rearwardly from the pair of rings between the pair of exterior side walls, the lower wall being shorter than the upper wall;

g) a perimeter of the eye opening formed by the walls of the shell and having a continuous edge configured to shape to the user's face and having:

i) an upper forehead edge configured to abut to a user's forehead;

ii) a lower check edge configured to abut to a user's cheeks;

iii) an exterior edge configured to abut to a user's temples; and iv) an interior edge configured to abut to a user's nose;

h) a fastener with first and second fastener portions carried on opposite sides of the shell at the eye opening, respectively; and i) the shell having at least two configurations, including:

(I) an open configuration in which the eye opening is open and the fastener is unfastened with the first and second fastener portions separated; and II) a closed configuration in which the opposite sides of the eye opening are folded in towards one another and the fastener is fastened with the first and second fastener portions joined together.

2. The eyepiece shield according to claim 1, further comprising:

a) the shell comprising a flexible and resilient material; and b) the shell comprising a laminate with different inner and outer layers sandwiching an intermediate foam layer.

3. The eyepiece shield according to claim 2, wherein the the outer layer is moisture resistant.

4. The eyepiece shield according to claim 2, wherein the intermediate layer is compressible.

5. The eyepiece shield according to claim 1, further comprising:

a) a pair of seams in the exterior side walls extending from the perimeter of the eye opening to adjacent the pair of rings without intersecting the pair of eyepiece holes; and b) the pair of rings continuously circumscribing the pair of eyepiece holes, respectively, without interruption by the pair of seams.

6. The eyepiece shield according to claim 1, further in combination with the sporting optic; and further comprising:

a) the pair of eyepiece holes sized smaller than the dual eyepieces of the sporting optic, respectively; and b) the pair of rings stretched over the dual eyepieces of the sporting optic, respectively, and held in place by a friction-fit between the pair of rings and the dual eyepieces.

7. The eyepiece shield according to claim 1, further in combination with the sporting optic; and further comprising: the pair of rings on the dual eyepieces of the sporting optic between a pair of eyecups and the dual eyepieces of the sporting optic, respectively.

* * * * *